(12) United States Patent
Choe et al.

(10) Patent No.: US 9,482,889 B2
(45) Date of Patent: Nov. 1, 2016

(54) DISPLAY ROOM MIRROR

(71) Applicant: LG INNOTEK CO., LTD., Seoul (KR)

(72) Inventors: Hae Min Choe, Seoul (KR); Geon Ho Roh, Seoul (KR); Sung Gon Jun, Seoul (KR)

(*) Notice: Subject to any disclaimer, the term of this patent is extended or adjusted under 35 U.S.C. 154(b) by 36 days.

(21) Appl. No.: 13/847,824

(22) Filed: Mar. 20, 2013

(65) Prior Publication Data
US 2013/0250189 A1    Sep. 26, 2013

(30) Foreign Application Priority Data

Mar. 23, 2012  (KR) .................. 10-2012-0029872

(51) Int. Cl.
| | |
|---|---|
| *G02F 1/1335* | (2006.01) |
| *G02F 1/13* | (2006.01) |
| *B60R 1/08* | (2006.01) |
| *B60R 1/12* | (2006.01) |

(52) U.S. Cl.
CPC ............. *G02F 1/1313* (2013.01); *B60R 1/088* (2013.01); *B60R 1/12* (2013.01); *G02F 1/133603* (2013.01); *G02F 1/133605* (2013.01); *G02F 1/133606* (2013.01); *B60R 2001/1253* (2013.01)

(58) Field of Classification Search
CPC ......... B60R 1/12; B60R 1/00; B60R 1/1207; B60R 1/04; B60R 1/088; B60R 1/02; B60R 11/0235; B60R 2011/0033; B60R 2011/1215; B60R 2300/8053; B60R 2300/8066; B60K 2350/927; B60Q 1/2665; B60Q 3/004; B60Q 3/023; G02B 2027/0118; G02B 2027/012; G02B 6/00; G02B 27/01; G02B 27/0101; Y10S 362/80; G02F 1/157; G02F 1/163; G02F 1/1313; G02F 1/133603; H01L 2924/12041; H01L 21/681; G01C 21/365

USPC ....... 362/494, 487, 135, 300, 492, 516, 540, 362/545, 549, 612, 615, 620, 631, 609, 362/97.1, 97.2, 339, 800; 340/815.4, 525, 340/435; 359/267, 265, 838, 839, 872, 245, 359/272, 263, 630, 833, 841, 883; 257/79; 345/7; 349/11, 61, 62, 64, 65, 67, 138, 349/150; 361/760

See application file for complete search history.

(56) References Cited

U.S. PATENT DOCUMENTS

| | | | |
|---|---|---|---|
| 6,218,934 B1 * | 4/2001 | Regan ............................ | 340/438 |
| 7,245,434 B2 * | 7/2007 | Nishida et al. ................ | 359/599 |
| 7,667,787 B2 * | 2/2010 | Mahama et al. ................ | 349/64 |
| 7,859,738 B2 * | 12/2010 | Baur et al. ...................... | 359/267 |
| 7,985,476 B2 * | 7/2011 | Kurino et al. ................. | 428/403 |
| 8,237,909 B2 * | 8/2012 | Ostreko et al. ................ | 349/195 |
| 8,339,526 B2 * | 12/2012 | Minikey et al. ................ | 349/11 |
| 2008/0198296 A1 * | 8/2008 | Chu et al. ........................ | 349/64 |

(Continued)

FOREIGN PATENT DOCUMENTS

| | | | | |
|---|---|---|---|---|
| JP | 2008-112833 | * | 5/2008 | ............. H01L 33/00 |
| KR | 20-0264726 Y1 | | 2/2002 | |

*Primary Examiner* — Thoi Duong

(74) *Attorney, Agent, or Firm* — Saliwanchik, Lloyd & Eisenschenk

(57) ABSTRACT

Provided is a display room mirror which is configured such that a display module, which includes: one or more light emitting units formed on a printed circuit board; a resin layer is formed on the light emitting units so that the light emitting units are embedded in the resin layer; a liquid crystal panel formed on the resin layer, is disposed on a rear surface the room mirror, thereby reducing an entire thickness and improving a degree of freedom in design.

17 Claims, 8 Drawing Sheets

(56) References Cited

U.S. PATENT DOCUMENTS

2011/0051412 A1\* 3/2011 Jeong et al. .................. 362/235
2011/0242492 A1\* 10/2011 Jung et al. ...................... 353/30
2011/0249215 A1\* 10/2011 Jung et al. ...................... 349/61

\* cited by examiner (a)

(b)

DISPLAY ROOM MIRROR

CROSS-REFERENCE TO RELATED APPLICATION

This application claims the benefit under 35 U.S.C. §119 of Korean Patent Application No. 10-2012-0029872, filed Mar. 23, 2012, which is hereby incorporated by reference in its entirety.

BACKGROUND

1. Field of the Invention

The present invention relates to the technical field of a room mirror for cars, and more specifically, to a room mirror having a display module.

2. Description of the Related Arts

In general, various audiovisual alarm devices are installed in cars as a means for safe driving. However, an alarm device for giving information on a dangerous situation of the rear area of a car which is beyond a driver's visual field is hardly installed. Mirrors are attached to various places of the inside and the outside of the car so that the driver can directly look a situation of the rear area of the car.

These mirrors are divided into a side mirror which is installed in a side door so as to observe the rear area of a car, and a room mirror which is installed in the front glass of a car interior so as to observe front and rear areas of the car.

Thanks to these mirrors, the driver can grasp a rear situation to a certain level. However, because an area in which the rear situation cannot be recognized, namely, a blind spot, which is not shown by the mirrors, may be generated, in a case where an obstacle is located in the blind spot, the obstacle collides with the car, thereby causing a safety accident.

Accordingly, a device which generates warning sounds to call the driver's attention when a car comes close to the obstacle has been recently provided. Thus, when the car comes close to the obstacle, the obstacle warning device for giving the driver information on situation has been installed so that a collision of the car and the backward obstacle can be inhibited in advance. Additionally, like a display room mirror as disclosed in Korean Registration Utility Model No. 20-0264726, by installing a monitor, which outputs an image signal so that the driver can confirm a rear image filmed by installing a rear surveillance camera in the car, in a room mirror, when the driver reverses or parks the car, the driver can exactly grasp a rear situation for providing safety.

FIG. 1 schematically illustrates the aforesaid conventional display room mirror.

Referring to FIG. 1, a conventional display room mirror 1 is composed of a room mirror 10, a display module 20 installed on a rear surface of the room mirror 10, and a fixing member 30 for fixing the display room mirror 1 to a front glass of a car as illustrated in (a) of FIG. 1. In the display room mirror 1, because the display module 20 should be located in the inside of the room mirror 10, the display module 20 needs luminance of more than 50 times compared to a general display module. Thus, a direct type backlight unit is used therefor.

More specifically, referring to (b) of FIG. 1, the conventional display module 20 has light emitting units 21 formed on a substrate 23, a light guide plate 25 formed on the light emitting units 21 and an optical sheet 27, and thus is composed in a structure which supplies light generated from the light emitting unit 21 to a liquid crystal display panel 29. However, in the conventional display module 20, a total optical gap H1 of the backlight unit is thickened due to a thickness H2 of the light guide plate 25 itself and a thickness H3 of an air gap formed in an upper part of the light guide plate 25. Thus, upon housing of the room mirror, it occupies much inner space. As a result, it is problematic that a total thickness ((a) of FIG. 1, W1) of the display room mirror 1 is thickened, and when mounting a high output light emitting diode, the total optical gap is thickened, and that a degree of freedom in design is reduced according to an increase in the total thickness.

PRIOR ART REFERENCE

Patent Reference

Korean Registration Utility Model No. 20-0264726

BRIEF SUMMARY

The present invention has been made keeping in mind the above problems occurring in related art. An aspect of the present invention provides a display room mirror, which is configured such that a display module, which includes: one or more light emitting units formed on a printed circuit board; a resin layer formed on the light emitting units so that the light emitting units are embedded in the resin layer; and a liquid crystal display panel formed on the resin layer, is disposed on a rear surface of the room mirror, thereby reducing an entire thickness and improving a degree of freedom in design.

According to an aspect of the present invention, there is provided a display room mirror having a display module, the display module including: a printed circuit board; one or more light emitting units formed on the printed circuit board; a resin layer formed on the light emitting units so that the light emitting units are embedded in the resin layer; and a liquid crystal display panel formed on the resin layer, wherein the resin layer is able to diffuse and guide light emitted from the light emitting units to the liquid crystal display panel.

According to the present invention, it is advantageous that the entire thickness of the display room mirror can be reduced by reducing the thickness of the display module, and thus a degree of freedom in design can improved.

Also, according to the present invention, in spite of the reduction in the thickness of the display module, because the high output light emitting diode may be mounted, luminance and visibility of the display module can be improved.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Exemplary embodiments according to the present invention will now be described more fully hereinafter with reference to the accompanying drawings. The exemplary embodiments of the present invention may, however, be embodied in many different forms and should not be construed as limited to the embodiments set forth herein. Rather these example embodiments are provided so that this disclosure will be thorough and complete, and will fully convey the scope of the invention to those skilled in the art. Furthermore, when it is determined that specific descriptions regarding publicly known relevant functions or configurations may unnecessarily be beside main points of the present invention, the corresponding descriptions are omitted. It will be further understood that terms used herein should be interpreted as having a meaning that is consistent with their meaning in the context of this specification. With regard to the elements which perform similar functions and operations, like numbers refer to like elements through the specification.

Figure 1:
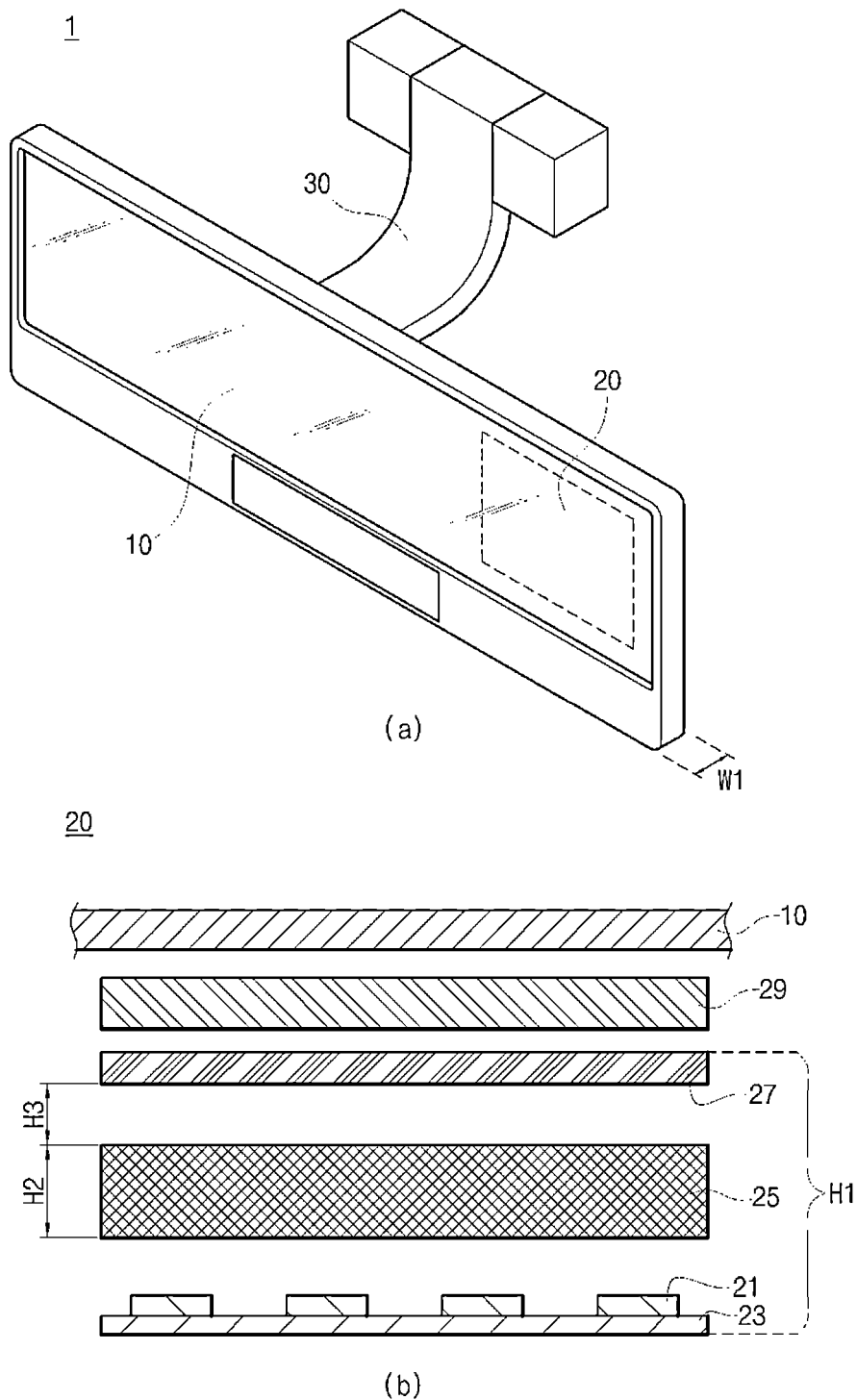
FIG. 1 schematically illustrates a structure of a conventional display room mirror.
Figure 2:
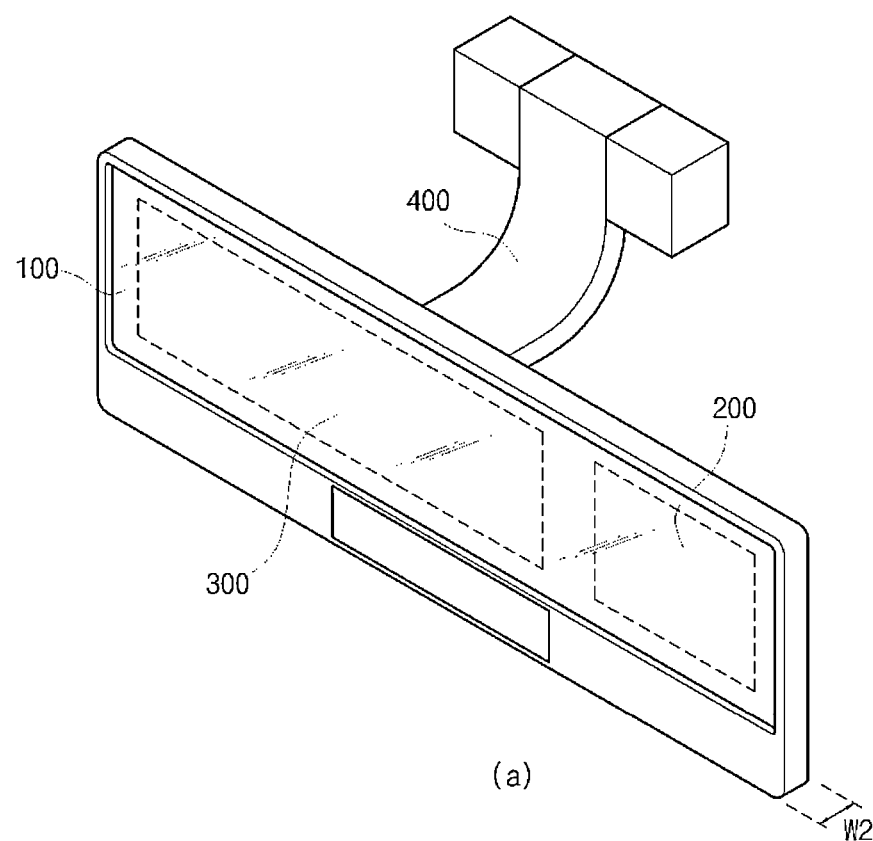
FIG. 2 schematically illustrates a structure of a display room mirror and a basic structure of a display module according to the present invention.
Figure 2:
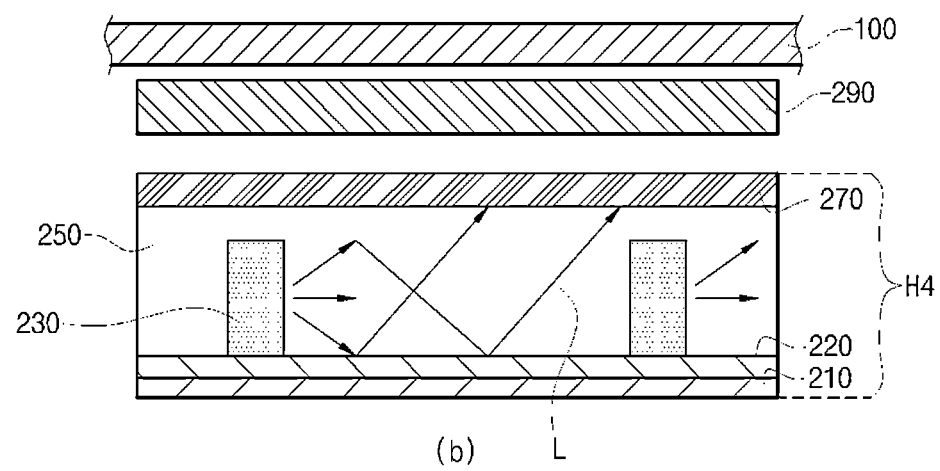

FIG. 2 schematically illustrates the structure of a display room mirror of the present invention. More specifically, (a) of FIG. 2 is an external perspective view of the display room mirror and (b) of FIG. 2 is a cross-sectional side view of a display module.

Referring to FIG. 2, a display room mirror according to the present invention includes: a room mirror 100; and a display module 200 formed in a partial area of a rear surface of the room mirror 100. Furthermore, the display room mirror may further include an ECM module 300 formed on the rear surface of the room mirror 100 and a fixing member 400 for fixing the display room mirror to a car front glass.

The room mirror 100 is a mirror which is mounted for securing a driver's rear visual field in the inner part of a car. A part corresponding to the display module 200 may be composed of a half mirror having both properties of transmitting and reflecting light to a front surface of the room mirror 100. Thus, when the display module 200 is operated, thanks to the transmission property of the half mirror, the driver can see information displayed in the display module 200. When the display module 200 is not operated, the display module 200 may be used as a mirror due to the reflection property of the half mirror. However, this is only one example. In addition to this, the entire room mirror 100 may be formed as the half mirror, or the half mirror may be mounted in the display module 200 itself. The elements may be appropriated designed and changed by those having ordinary skill in the art.

The ECM (Electrochromic Mirror) module 300 changes reflectance of the room mirror 100 so as to inhibit a glariness phenomenon of the driver due to reflection generated from the headlight of a rear car. More specifically, the ECM module 300 is a device which changes the reflectance of the room mirror 100 using the redox reaction of an EC (Electro chromatic) device according a difference in the brightness of light measured by a sunlight sensor such as a photo diode for measuring brightness of the front and the rear of the car. The ECM module of the present invention may include an ECM circuit board fixed to the rear surface of the room mirror 100 through an adhesive or a separate fixing member, a front optical sensor, a rear optical sensor and a thin film of the EC device disposed in the room mirror 100. Thus, by changing a coloring amount of the EC device according to a difference in the brightness of light which is sensed by the front optical sensor and the rear optical sensor, reflectance of the room mirrors 100 is changed, thereby controlling the driver's glariness caused by the headlight of the rear car.

Figure 9:
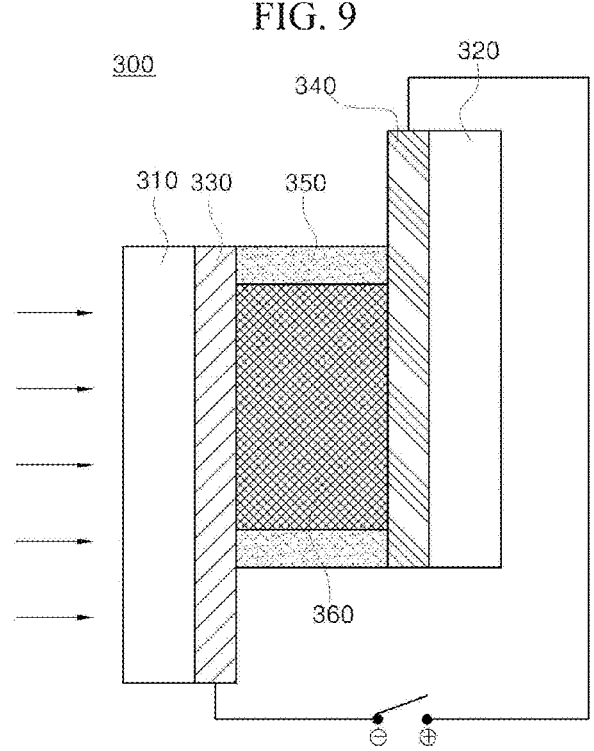
FIG. 9 through FIG. 11 are views illustration a rough structure of an ECM module according to the present invention.
Figure 10:
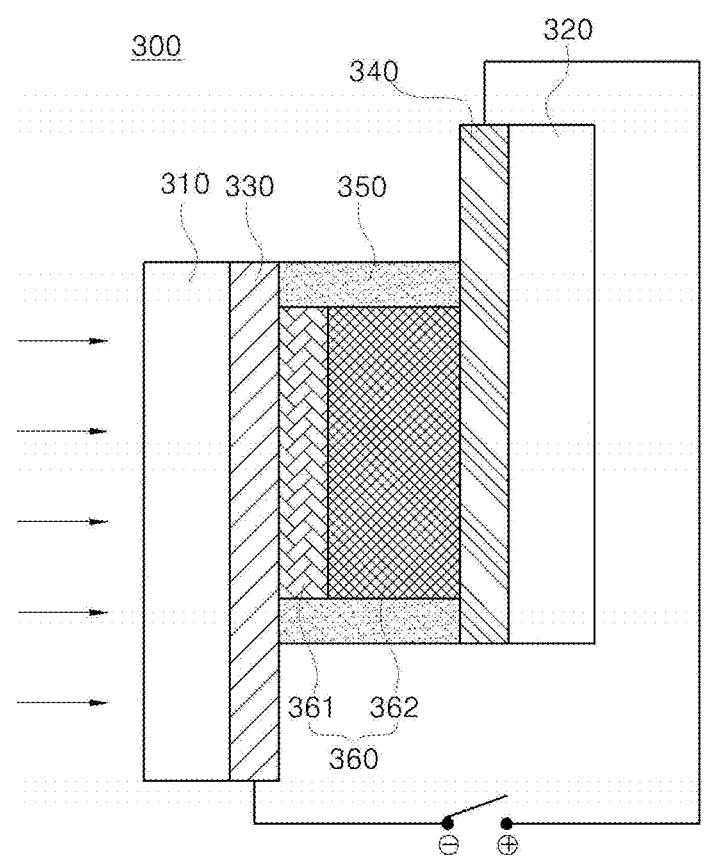
Figure 11:
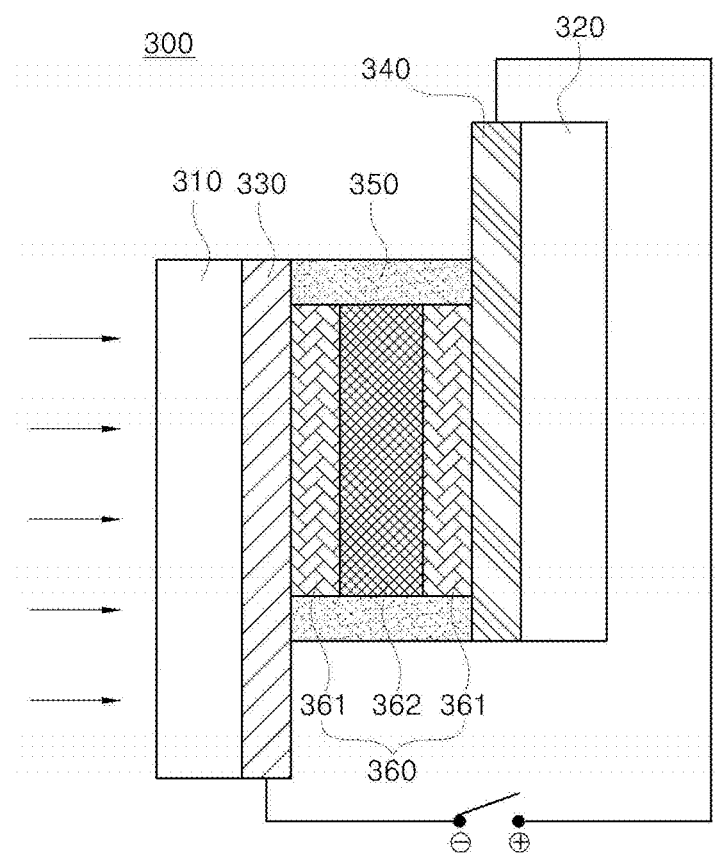

More specifically, referring to FIG. 9 to FIG. 11, the ECM module according to the present invention may include: a first transparent substrate 310 and a second transparent substrate 320 which are opposed to each other with a predetermined distance; a transparent electrode 330 and a conductive reflection layer 340 which are formed on an opposed surface of the first and second transparent substrates 310, 320, respectively; an electrochromic layer 360 which is formed between the transparent electrode 330 and the conductive reflection layer 340; a sealing unit 350 for sealing the electrochromic layer. The ECM module 300 uses a electrochromic material in which an optical property of the material may be reversibly changed by an electrical and chemical redox reaction, and has no color when an electrical signal is not applied from the outside, but has color when the electrical signal is applied, thereby adjusting reflectivity of the room mirror.

The first and second transparent substrates 310, 320 may be a glass substrate. However, this is not limited. The substrates may be composed of a transparent material such as silicon, synthetic resin, aerogel and the like.

The transparent electrode 330 may be deposited on the first transparent substrate 310, and may be any one selected from the group consisting of ITO (Indium Tin Oxide), FTO (Fluor doped Tin Oxide), AZO (Aluminium doped Zinc Oxide), GZO (Galium doped Zinc Oxide), ATO (Antimony doped Tin Oxide), IZO (Indium doped Zinc Oxide), NTO (Niobium doped Titanium Oxide), ZnO and a combination thereof. However, this is only one example, but is not limited.

The conductive reflection layer 340 is formed on the second transparent substrate 320 and performs a function as a reflection plate for reflecting incident light passing through the electrochromic layer 360 and a function as a counter electrode of the transparent electrode 330. The conductive reflection layer 340 may be composed of at least one metal selected from the group including Cu, Au, Ag, Ni, Al, Cr, Ru, Re, Pb, Sn, In and Zn, or an alloy including the metals. However, this is only one example, but is not limited.

The electrochromic layer 360 is composed of a liquid or solid electrochomic material and an electrolyte, is formed between the transparent electrode 330 and the conductive reflection layer 340, and receives electricity applied from the transparent electrode 330 and the conductive reflection layer 340, thereby causing coloring or decolorization through an oxidation reaction or a reduction reaction. The electrochromic layer 360 may be formed by a vacuum bonding method by injecting the electrochromic material and the electrolyte between the transparent electrode 330 and the conductive reflection layer 340. The electrochromic material may be an organic or inorganic electrochromic material. The organic electrochromic material may be composed of viologen, anthraquinone, polyaniline or polythiopene, and the inorganic electrochromic material may be $WO_3$, $MoO_3$, $CeO_3$, $MnO_2$, or $Nb_2O_5$.

At this time, in a case where the electrochromic material is a solid state, the electrochromic layer 360 may include an electrolytic layer 362 and an electrochromic coating layer 361 formed on one surface or both surfaces of the electrolyte layer 362. That is, as illustrated in FIG. 10, the electrochromic coating layer 361 may be formed only between the electrolyte layer 362 and the transparent electrode 330, or as illustrated in FIG. 11, the electrochromic coating layer 361 may be formed on both surfaces of the electrolyte layer 362. Furthermore, the electrochromic coating layer 361 may be formed only between the electrolyte layer 362 and the conductive reflection layer 340, even though this is not illustrated. Also, when a thickness of the electrochromic coating layer 361 is less than 100 nm, it would be difficult to show a proper function of the electrochromic material, and when the thickness thereof is more than 700 nm, a durability problem such as the generation of a crack is generated. Thus, it would be preferable that the thickness of the electrochromic coating layer 161 is formed in a range of 100 nm to 700 nm. However, the thickness is not limited to this.

When the electrochromic material is a liquid state, uniform discoloration is not performed. Furthermore, since a voltage should be continuously applied to maintain the discoloration state, electric consumption is required. However, as described above, when the electrochromic coating layer 361 in a solid state is formed, uniform coloring and decolorization can be performed. Furthermore, since the electrochromic material has a memory effect, and thus a voltage is applied only when the coloring and decolorization are performed, the electric consumption is small. Also, because a counter voltage is applied upon the decolorization, the speed of a decolorization reaction is fast, and because the electrochromic material to which a coating method is applied is an inorganic or organic polymer, durability of the device can be improved.

Like this, the driver's glariness may be controlled by using the oxidation and reduction reactions of the electrochromic device according to the brightness of light and changing reflectance of the room mirror 100.

The display module 200 is a part which visually displays a rear mage or other information received from a rear camera. In particular, in the display module 200 according to the present invention, the conventional light guide plate is removed from a light supply unit (or a backlight unit) for supplying light to a liquid crystal display panel 290, and the resin layer is formed to replace it, thereby innovatively reducing the entire thickness of the display module 200.

More specifically, referring to (b) of FIG. 2, the display module 200 according to the present invention may include a plurality of light emitting units 230 formed on a printed circuit board 210, and a resin layer 250 which is formed on the light emitting units 230 so that the light emitting units 230 are embedded in the resin layer, and diffuses and guides the emitted light to the liquid crystal display panel 290. Also, a reflection sheet 220 may be laminated on an upper surface of the printed circuit board 210, and a diffusion sheet 270 may be provided in an upper part of the resin layer 250. Additionally, the prism sheet and the protective sheet may be provided.

The light emitting units 230 are configured such that one or more light emitting units are arranged on the printed circuit board 210, thereby emitting light. The light emitting units 230 of the present invention may be composed of side view type light emitting diodes. That is, a light source having a structure in which the light emitted from the light emitting units 230 is emitted in a lateral direction rather than going straight up may be used. Thus, the light emitting units 230 composed of the side view type light emitting diodes are disposed in a direct type, and the resin layer which functions to diffuse and reflect light is utilized so that the light is diffused and guided in a direction of the liquid crystal display panel 290, thereby reducing the number of light emitting units and innovatively reducing an entire thickness of the display module.

The resin layer 250 is laminated in a structure which surrounds around the light emitting units 230 by embedding the light emitting units, and functions to disperse the light of the light source emitted from the light emitting units 230 in the lateral direction. That is, the resin layer 250 of the present invention performs the function of the conventional light guide plate. The resin layer 250 of the present invention may be basically composed of a resin material which can diffuse the light. For example, the resin layer 250 of the present invention may be composed of a ultraviolet curing resin including a oligomer. More specifically, the resin layer 250 may be formed using the resin which has a urethane acrylate oligomer as a main raw material. For example, a resin in which the urethane acrylate oligomer which is a synthetic oligomer is mixed with a polymer type which is polyacryl may be used. Of course, in addition to this, a monomer, in which IBOA (isobornyl acrylate), HPA (Hydroxylpropyl acrylate), 2-HEA (2-hydroxyethyl acrylate), which are low boiling point and diluted type reactive monomers, are mixed, may be further included. A photo initiator (e.g. 1-hydroxycyclohexyl phenyl-ketone and the like) or an antioxidant and the like may be mixed as an additive. However, this is only one example. In addition to these materials, all resins capable of performing the light diffusion function, which have been developed and commercialized or can be implemented according to future technical development, may be used for the resin layer 250.

The resin layer 250 of the present invention may include beads for increasing a diffusion and reflection amount of light. The more detailed contents thereon will be described in the explanation of FIG. 3. That is, the light emitted from the light emitting units 230 in the lateral direction is diffused and reflected through the resin layer 250 and the beads, thereby being emitted in the upper direction of a position where the liquid crystal panel 290 is located. In a case where the reflection sheet 220 and the reflection pattern are provided, a reflection function may be more promoted. Thanks to this resin layer 250, the thickness occupied by the conventional light guide plate can be innovatively reduced. Thus, it can be provided with the effects that the thickness of the display module 20 is reduced, and thus the entire thickness of the display room mirror is reduced, and that a degree of freedom in design is improved. Also, because the resin layer 250 has a flexible material, when the printed circuit board 210 is composed of a flexible printed circuit board, the display module may additionally have generality which can be also applied to flexible display devices. Also, in spite of the mounting of high output light emitting units, the entire thickness of the display module may be reduced, the problem of the conventional display module having a direct type structure that the thickness of the optical gap should be thickened when mounting the high output light emitting units can be solved. In addition to this, luminance of the display module can be also improved.

The reflection sheet 220 is formed of a material having high reflection efficiency and functions to reduce light loss by reflecting the light emitted from the light emitting units 230 to an upper part in which the liquid crystal display panel 290 is located. The reflection pattern may be further formed on a surface of the reflection sheet 220. The detailed explanation thereon will be described in an explanation of FIG. 3.

The diffusion sheet 270 functions to diffuse the light emitted through the resin layer 250. Particularly, to inhibit an optical property from being reduced due to excessively strong light or a yellowish phenomenon from being generated, the optical pattern may be further provided so that a light shielding effect is implemented in a certain part. That is, to inhibit the concentration of light, the light shielding pattern may be printed using a light shielding ink.

Figure 3:
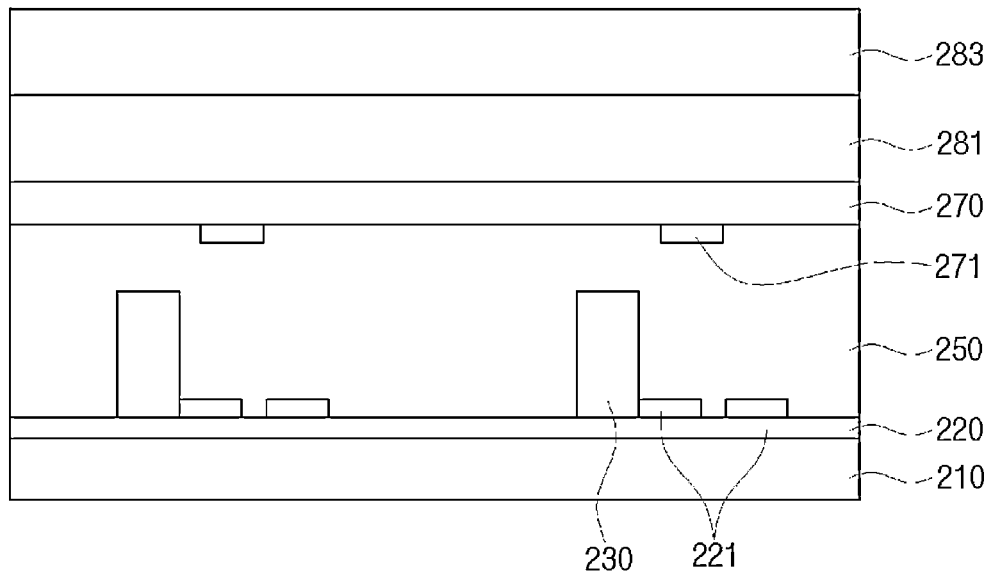
FIG. 3 illustrates a transformation structure of the display module according to the present invention.

FIG. 3 illustrates the transformation structure of a display module according to the present invention. More specifically, FIG. 3 illustrates a structure in which the reflection pattern 221 and the optical pattern 271 are further formed in the display module as illustrated in FIG. 2.

Referring to FIG. 2 and FIG. 3, the reflection sheet 220 of the present invention is formed on an upper surface of the printed circuit board 210. Furthermore, the reflection sheet 220 is formed of a material having high reflection efficiency, and thus reflects the light emitted from the light emitting units 230 to an upper part in which the liquid crystal panel 290 is located, thereby functioning to reduce light loss. To realize a light reflection property and a property of promoting light diffusion, the reflection sheet 220 may be formed of a synthetic resin in which a white pigment is diffused and contained. For example, titanium oxide, aluminum oxide, zinc oxide, lead carbonate, barium sulfate, calcium carbonate and the like may be used as the white pigment. Polyethylene terephthalate, polyethylene naphtaenate, acryl resin, poly carbonate, polystyrene, polyolefin, cellulose acetate, weather resistant vinyl chloride and the like may be used as the synthetic resin. However, the white pigment and the synthetic resin are not limited to this.

The reflection pattern 221 may be formed on a surface of the reflection sheet 220. The reflection pattern 221 functions to uniformly transmit light to the liquid crystal display panel 290 by scattering and diffusing incident light. The reflection pattern 221 may be formed by printing the surface of a reflection member 120 using a reflection ink including any one of $TiO_2$, $CaCO_3$, $BaSO_4$, $Al_2O_3$, Silicon and PS, but being not limited to this. Also, the reflection pattern 221 may have a structure in which a plurality of protruding patterns are provided and may be composed in a prism shape, a lenticular shape, a lens shape or a combined shape thereof to improve the scattering effect of light. However, the shape is not limited to this. Also, a cross section of the reflection pattern 221 may have various shapes such as a triangular shape, a quadrangular shape, a semicircular shape, a sinusoidal shape and the like.

Meanwhile, as described in the explanation of FIG. 2, the optical pattern 271 may be further formed on a surface of the diffusion sheet 270, particularly, a lower surface. The contents regarding the remaining elements except for the element are identical with those as described in the explanation of FIG. 2, thereby being omitted.

Figure 4:
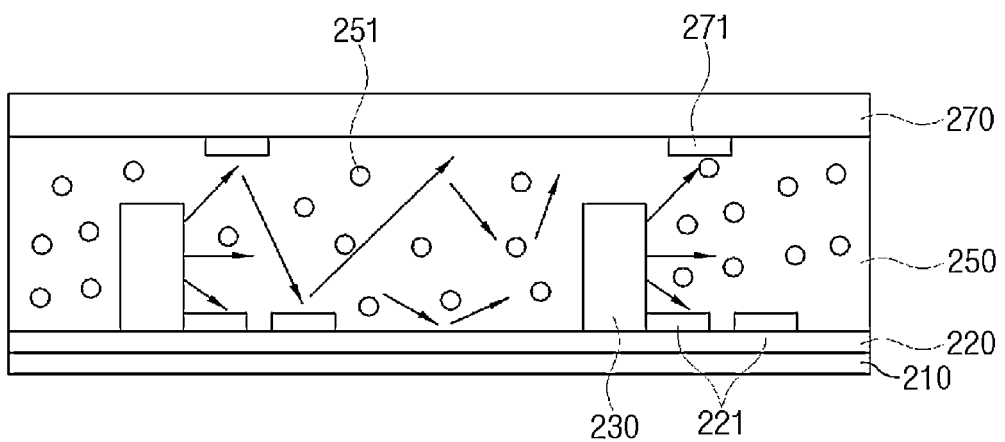
FIG. 4 is an operational state view illustrating the function of a resin layer and beads of the display module according to the present invention.

FIG. 4 illustrates each function of the resin layer and the beads of the display module according to the present invention.

The resin layer 250 of the present invention may be formed in a shape in which a plurality of beads 251 are mixed and diffused in an inner part of the resin layer 250. The beads 251 functions to improve light reflection and diffusion properties.

For example, when the light emitted from the light emitting units 230 is incident to the beads 251 of the inner part of the resin layer 250, the light is reflected and transmitted due to a hollow of the beads 251, and thus is emitted to the liquid crystal display panel 290. At this time, reflectance and diffusivity of the light are increased due to the beads 251. Thus, an amount and uniformity of emitted light supplied to the liquid crystal display panel 290 are improved, thereby improving luminance of the display module.

The beads of the present invention may be usually composed of glass or any one selected from silicon, silica, glass bubble, PMMA, urethane, Zn, Zr, $Al_2O_3$ and acryl. In addition to this, the beads may be composed of a polyester resin, polyacryl resin, polystyrene resin, polycarbonate resin, polyamide resin and the like, which have high transparency. However, the material is not limited to this.

A content of the beads 251 may be appropriately adjusted to obtain a light diffusion effect. More specifically, the content may be adjusted within a range of 0.01 wt. % to 0.3 wt. % to a total weight of the resin layer 250. However, the content is not limited to this.

Meanwhile, in addition to the aforesaid beads 251, the resin layer 250 of the present invention may further include an inorganic substance such as $BaSO_4$, $TiO_2$, $CaCO_3$ as a pigment in order to improve reflectance, even though this is not illustrated in the drawing. Also, an additive may be further mixed in the resin layer 250 within a range which does not hamper the reflection and diffusion effects. A material such as a fluorescent whitening agent, a cross linking agent, a heat resistant stabilizer, an anti-oxidation stabilizer, a ultraviolet ray absorbent, an anti-static agent or a mixture thereof may be used as the additive. However, the additive is not limited to this.

Figure 5:
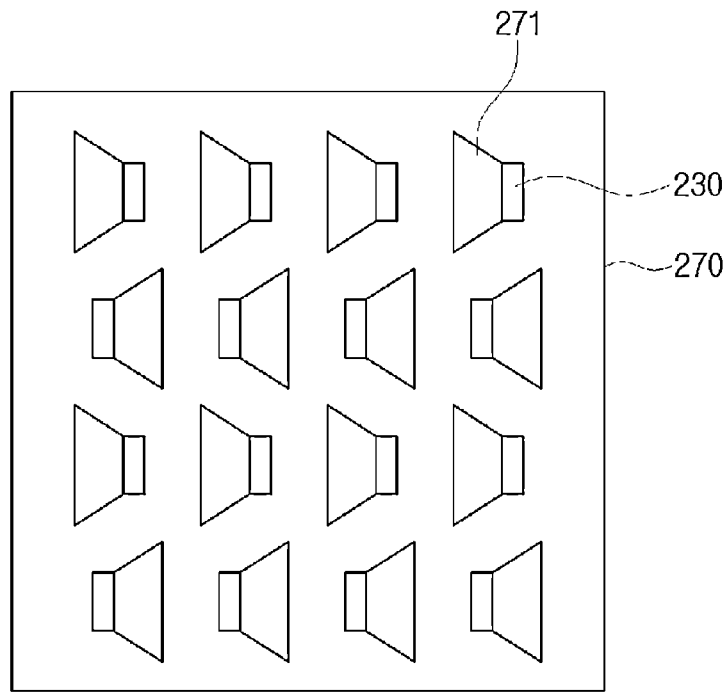
FIG. 5 is a plane view illustrating the disposition of an optical pattern included in light emitting units and a diffusion sheet of the display module according to the present invention.

FIG. 5 is a plane view illustrating a disposition of the optical pattern included in the light emitting units and the diffusion sheet of the display module according to the present invention.

Referring to FIG. 5, the optical pattern 271 may be basically implemented in such a manner that the optical pattern 271 is printed on a lower surface or an upper surface of the diffusion sheet 270. More specifically, the optical pattern may be disposed in a direction (a previous direction) of the light emitted from the light emitting unit 230 disposed at a lower part of the diffusion sheet 270. That is, the optical pattern may be disposed at a position corresponding to a vertical upper surface or a surface in a light emitting direction of the light emitting units 230 of the diffusion sheet 270.

Figure 6:
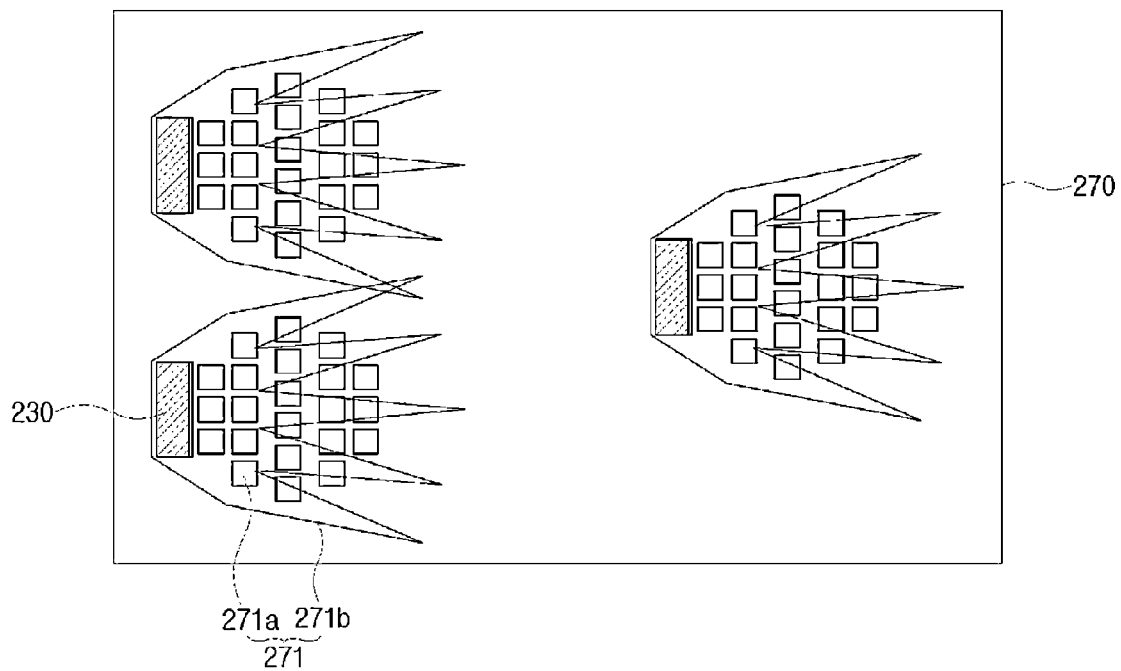
FIG. 6 is a plane view illustrating an implemented embodiment of the optical pattern according to the present invention.

FIG. 6 is a plane view schematically illustrating an exemplary embodiment of the optical pattern.

The optical pattern 271 may function to partially shield and diffuse light rather than functioning to completely shield the light and may be implemented so as to adjust a light shielding or diffusing level. Furthermore, the optical pattern 271 according to the present invention may be implemented in the overlapping print structure of a complex pattern. The overlapping print structure means a structure implemented by forming one pattern and printing another one pattern shape thereon.

For example, when the optical pattern 271 is implemented, the optical pattern 271 may be implemented in an overlapping print structure of the diffusion pattern 271a, which is formed on a lower surface of the diffusion sheet in a light emitting direction using a light shielding ink containing one or more materials selected from $TiO_2$, $CaCO_3$, $BaSO_4$, $Al_2O_3$ and Silicon, and a light shielding pattern 271b, which is formed using a light shielding ink containing Al and a mixture of Al and $TiO_2$. That is, the optical pattern may be formed by white-printing the diffusion pattern 271a on a surface of the diffusion sheet 270, and thereafter, forming the light shielding pattern 271b thereon. In reverse, the optical pattern may be formed in a double structure. Of course, it would be obvious that the formation design of the pattern may be variously changed in consideration of the efficiency and strength of light and a shading ratio.

Also, the optical pattern may be formed in such a triple structure that in a sequential laminated structure, the light shielding pattern, which is a metal pattern, is formed in a middle layer, and diffusion patterns are implemented, respectively in an upper part and a lower part thereof. In this triple structure, the patterns may be implemented by selecting the aforesaid materials. As one preferred example, based on the triple structure in which one diffusion pattern of diffusion patterns is implemented using $TiO_2$ having excellent reflectance, another diffusion pattern is implemented using $CaCO_3$ and $TiO_2$ together having excellent safety and color sense, and the light shielding pattern is implemented using Al having excellent hiding power, the efficiency and uniformity of light can be secured. In particular, $CaCO_3$ functions to decrease the exposure of yellowish light, and thus functions to finally implement white light, so that the more stable efficiency of light can be implemented. In addition to $CaCO_3$, inorganic materials having a large particle size and a similar structure such as $BaSO_4$, $Al_2O_3$ and Silicon beads and the like may be utilized.

Moreover, in view of the efficiency of light, it would be preferable that the optical pattern 271 is formed by adjusting a pattern density in such a manner that the pattern density is reduced as the optical pattern is moved far from the light emitting direction of the LED light source. However, the present invention is not limited to this.

Figure 7:
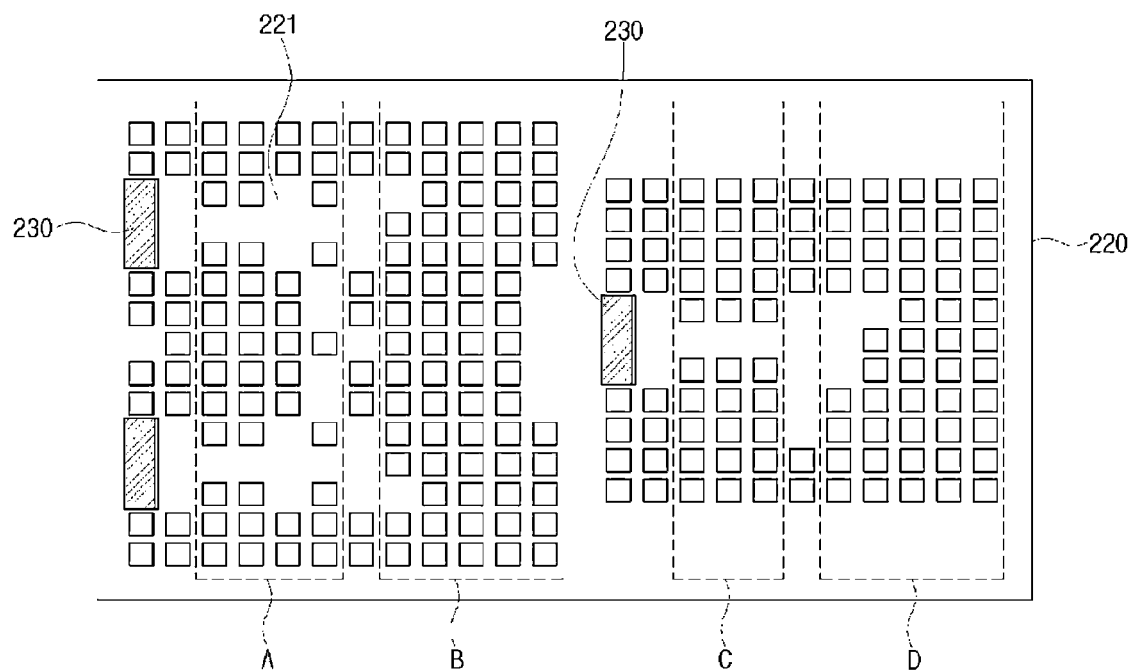
FIG. 7 is an exemplary view illustrating a reflection pattern according to the present invention.

FIG. 7 is a plane view illustrating a structure of the reflection sheet 220 and the reflection pattern 221 according to the present invention.

Referring to FIG. 7, the reflection sheet 220 according to the present invention is laminated on the printed circuit board, and the light emitting units 230 protrude to the outside by passing through a hole formed on the reflection sheet 220. As described above, in a case where the light emitting units 230 are implemented with side view type light emitting diodes, the number of light sources may be largely reduced. The reflection pattern 221 may be further implemented so as to largely improve the reflectance of light while reducing the number of light sources.

As illustrated in FIG. 7, the reflection pattern 221 may be formed in a light emitting direction of the light emitting units 230. In particular, the reflection pattern 221 may be formed so that a pattern density becomes high as the reflection pattern 221 is moved far from the light emitting direction of the light emitting units. That is, the pattern density of a second area B, which is far from the light emitting direction, is implemented to be higher than that of a first area A which is near from the light emitting direction, thereby improving light reflectance. Of course, the structure of the pattern may be implemented in various shapes according to a design intention. Moreover, the formation of the reflection pattern 221 may be implemented in such a manner that the reflection pattern 221 is printed on the reflection sheet 220 using a reflective ink including any one of $TiO_2$, $Al_2O_3$, $CaC_{O3}$, $BaS_{O4}$, Silicon and PS.

Figure 8:
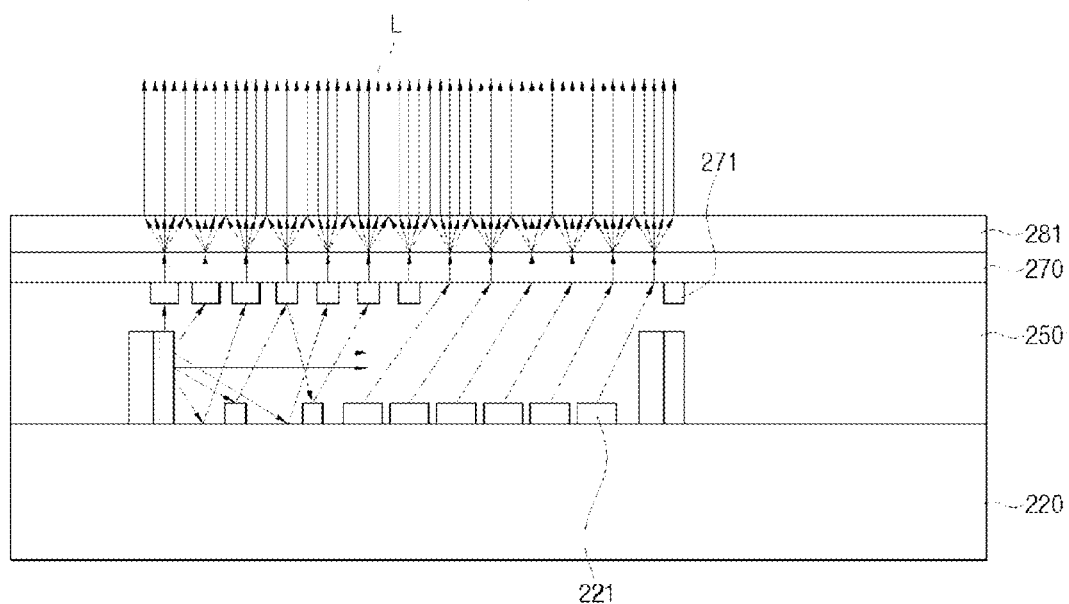
FIG. 8 is a view illustrating an operational state of the display module according to the present invention.

FIG. 8 illustrates an operational state of the display module according to the present invention.

Referring to FIG. 8, in the display module according to the present invention, the light is emitted from the light emitting units 230 composed of side view type light emitting diodes in a lateral direction, and the emitted light is reflected and diffused at the resin layer 250 formed instead of the conventional light guide plate. At this time, the reflection efficiency can be particularly increased by the reflection sheet 220 and the reflection pattern 221 and the light may be uniformly guided in a direction of the liquid crystal display panel. The light, which passes through the resin layer 250, is diffused or shielded through the optical pattern 271 formed on the diffusion sheet 270. The light L, which is refined by such a way, is incident to the liquid crystal display panel through the optical sheet such as the prism sheet 281 and the like as white light.

The display room mirror according to the present invention is implemented using the display module having a thin thickness. Thus, because the light guide plate is not used, an entire thickness can be reduced and a degree of freedom in design according to the reduction in thickness can be improved. Also, in spite of slimming of the display module, the problems such as luminance degradation and uniformity may be supplemented by the reflection pattern and the optical pattern of the light shielding pattern, the diffusion pattern and the like. Thus, the effect that visibility of the display module is improved may be additionally realized.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A display room mirror comprising a display module, wherein the display module comprises:
    a printed circuit board;
    a reflection sheet formed on an upper surface of the printed circuit board;
    one or more light emitting units formed on the reflection sheet;
    a plurality of reflection patterns formed on the reflection sheet;
    a resin layer formed on the reflection sheet;
    a diffusion sheet formed on the resin layer;
    an optical pattern formed on a lower surface of the diffusion sheet;
    a liquid crystal display panel formed on the diffusion sheet; and
    a room mirror disposed on the liquid crystal display panel and configured to transmit and reflect light;
    wherein a pattern density of the plurality of reflection patterns increases as a distance from the light emitting units increases,
    wherein the optical pattern functions to partially shield and diffuse light emitted from the light emitting units,
    wherein the light emitting units, the plurality of reflection patterns, and the optical pattern are embedded in the resin layer;
    wherein the optical pattern comprises a diffusion pattern and a light shielding pattern;

wherein the diffusion pattern, the light shielding pattern, and the light emitting units are buried in the resin layer;

wherein the diffusion pattern comprises:
- a first diffusion part covered by the light shielding pattern; and
- a second diffusion part covered by the resin layer;

wherein the light shielding comprises:
- a first shielding part disposed on a lower surface of the first diffusion part; and
- a second shielding part disposed on the lower surface of the diffusion sheet; and wherein a side surface of a reflection pattern of the plurality of reflection patterns is directly contacted with a light emitting unit of the one or more light emitting units.

2. The display room mirror of claim 1, further comprising an ECM module formed on a rear surface of the room mirror.

3. The display room mirror of claim 2, wherein the ECM module comprises: a first transparent substrate and a second transparent substrate which are opposed to each other at a predetermined distance; a transparent electrode and a conductive reflection layer which are formed on an opposed surface of the first and second transparent substrates, respectively; and
- an electrochromic layer interposed between the transparent electrode and the conductive reflection layer.

4. The display room mirror of claim 3, wherein the electrochromic layer comprises: an electrolytic layer interposed between the transparent electrode and the conductive reflection layer; and an electrochromic coating layer formed on one surface or both surfaces of the electrolytic layer.

5. The display room mirror of claim 1, wherein the room mirror is formed of a half mirror.

6. The display room mirror of claim 1, wherein the printed circuit board is composed of a flexible printed circuit board.

7. The display room mirror of claim 1, wherein the light emitting units are composed of side view type light emitting diodes.

8. The display room mirror of claim 1, wherein the reflection patterns are formed with a reflective ink including any one of $TiO_2$, $Al_2O_3$, $CaCO_3$, $BsSO_4$, Silicon and PS.

9. The display room mirror of claim 1, wherein the resin layer is formed to include beads which increases a reflection amount of light.

10. The display room mirror of claim 9, wherein the beads are composed of any one selected from silicon, silica, glass bubble, PMMA, urethane, Zn, Zr, $Al_2O_3$, and acryl.

11. The display room mirror of claim 1, wherein the optical pattern is formed on the lower surface of the diffusion sheet, and wherein the display room mirror is configured such that light emitted from the light emitting units strikes the lower surface of the diffusion sheet.

12. The display room mirror of claim 1, wherein the diffusion pattern formed using a light shielding ink including one or more materials selected from $TiO_2$, $CaCO_3$, $BaSO_4$, $Al_2O_3$ and Silicon overlaps with the light shielding pattern formed using a light shielding ink including Al or a mixture of Al and $TiO_2$.

13. The display room mirror of claim 12, wherein the diffusion pattern is formed in a structure in which the diffusion pattern is printed on at least one surface of an upper surface and a lower surface of the light shielding pattern.

14. The display room mirror of claim 1, wherein as the optical pattern is moved far from the light emitting units, a pattern density thereof is reduced.

15. The display room mirror of claim 1, wherein the display module is configured such that the liquid crystal display panel is disposed to be opposed to the room mirror.

16. The display room mirror of claim 1, wherein the resin layer is composed of an ultraviolet curing resin including an oligomer.

17. The display room mirror of claim 16, wherein the oligomer is composed of any one material selected from urethane acrylate, epoxy acrylate, polyester acrylate and acrylic acrylate.

* * * * *